United States Patent [19]

Hirose

[11] Patent Number: 5,171,488
[45] Date of Patent: Dec. 15, 1992

[54] METHOD OF MANUFACTURING AN OPTICAL COMPENSATOR

[75] Inventor: Shinichi Hirose, Isehara, Japan

[73] Assignee: Stanley Electric Co., Ltd., Tokyo, Japan

[21] Appl. No.: 746,986

[22] Filed: Aug. 19, 1991

[30] Foreign Application Priority Data

Aug. 28, 1990 [JP] Japan .................. 2-226398

[51] Int. Cl.⁵ .................. B29C 71/02; B29D 11/00
[52] U.S. Cl. .................. 264/1.3; 264/2.6; 264/102; 264/345; 264/346
[58] Field of Search .................. 264/1.3, 2.6, 102, 345, 264/346

[56] References Cited

U.S. PATENT DOCUMENTS

| | | | |
|---|---|---|---|
| 3,632,841 | 1/1972 | Fortin | 264/291 |
| 4,133,775 | 1/1979 | Bloom | 252/300 |
| 4,360,483 | 11/1982 | Ayres | 264/2.7 |
| 4,361,527 | 11/1982 | Rau | 264/25 |
| 4,385,806 | 5/1983 | Fergason | 350/332 |
| 4,614,634 | 9/1986 | Weber et al. | 264/1.3 |
| 4,701,028 | 10/1987 | Clerc et al. | 350/337 |
| 4,847,033 | 7/1989 | Carroll, Jr. | 264/1.3 |

FOREIGN PATENT DOCUMENTS 0239433  9/1987  European Pat. Off. .
1462978  1/1977  United Kingdom .

*Primary Examiner*—James Lowe
*Attorney, Agent, or Firm*—Nixon & Vanderhye

[57] ABSTRACT

An optical compensator plate is prepared by applying heat and pressure to an ionomer resin in an autoclave to form a resin film having a birefringence, annealing the resin film at a temperature range not less than the softening temperature and not higher than the melting point of the resin, e.g. 60°-100° C. for at least about 30 minutes.

6 Claims, 2 Drawing Sheets

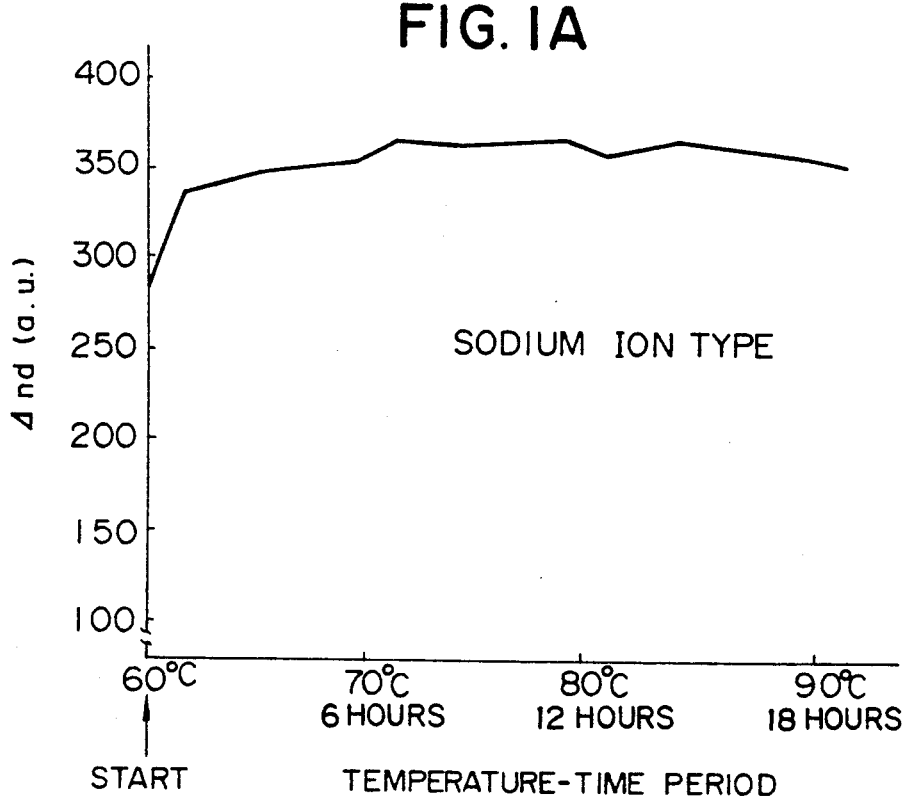
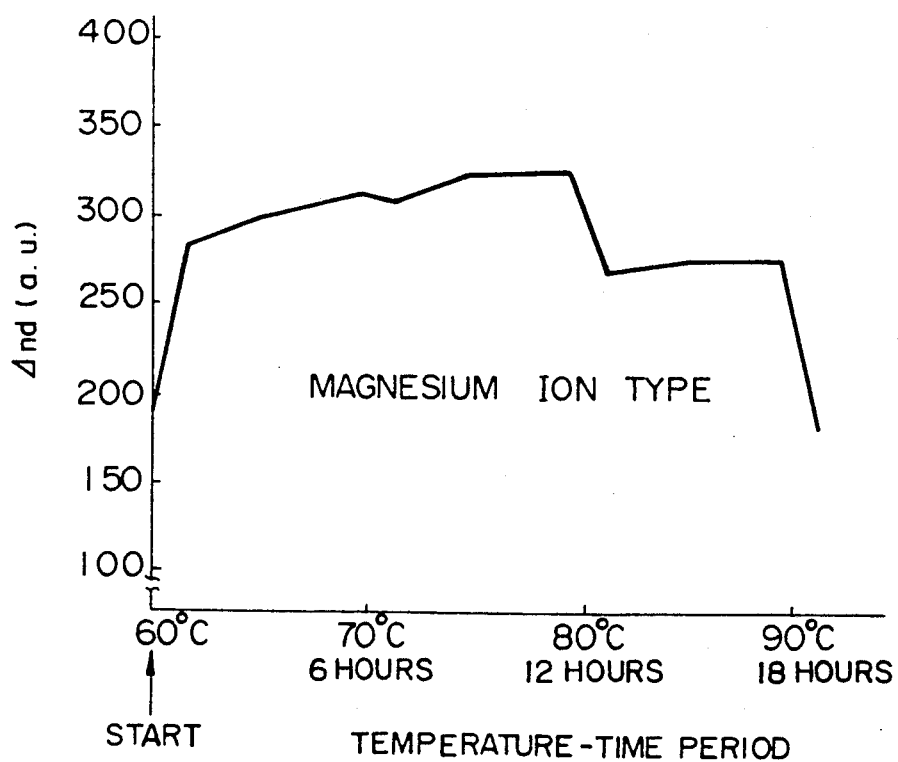

METHOD OF MANUFACTURING AN OPTICAL COMPENSATOR

BACKGROUND OF THE INVENTION

1. Field of the Invention

This invention relates to a method of manufacturing an optical compensator plate, and more particularly to a method of manufacturing an optical compensator plate having a negative optical anisotropy or activity.

2. Description of the Related Art

An optical compensator is an optical component having an optical anisotropy, used for compensating the optical anisotropy of another optical component of interest.

Liquid crystal molecules used in such devices as liquid crystal display devices ordinarily have an elongated shape, have a high refractive index in the direction parallel to the molecular axis and a low refractive index in directions perpendicular to the molecular axis.

When such liquid crystal molecules are oriented perpendicular to the substrate between a pair of transparent substrates, the liquid crystal cell will show a positive optical anisotropy. Performance of the liquid crystal cell in this state depends primarily on the angle measured from the normal of the substrates.

For compensating this positive optical anisotropy, there is needed a material having a negative optical anisotropy having a low refractive index in the direction of thickness, and a high refractive index in the directions in the plane. Further, it is necessary to adjust the degree of optical anisotropy $\Delta n \cdot d$ of the optical compensator plate, where $\Delta n = n_0 - n_e$, n is the refractive index, $n_0$ is the refractive index for the ordinary ray, and $n_e$ is the refractive index for the extraordinary ray, and d is the thickness of the compensator plate, in accordance with the degree of the optical anisotropy to be compensated. However, it is not easy to manufacture an optical medium having the desired optical properties.

SUMMARY OF THE INVENTION

An object of this invention is to provide a method of manufacturing an optical compensator plate which exhibits little variation of its optical properties over long term use.

According to an aspect of this invention, there is provided a method of manufacturing an optical compensation plate comprising: a first step of applying heat and pressure to a thermoplastic resin film to form a resin film having birefringence; and a second step of annealing said resin film after said first step, at an annealing temperature in a temperature range not less than the softening temperature and not higher than the melting point of said resin, for about 30 minutes or more.

The optical properties of the optical compensator can be stabilized by annealing after manufacture of the optical compensator plate.

After manufacture of the optical compensator plate, the variation of the thickness d is of a negligible amount, and hence the variation of the optical anisotropy $\Delta n \cdot d$ is considered to be due mainly to the variation of the refractive index n.

Just after the manufacture of the optical compensator plate, thermal hysteresis occurring during the manufacturing process is considered to remain in the film as internal stresses. Also, it can be considered that the crystalinity of the plate is not yet stabilized. By annealing at a temperature above the softening temperature of the thermoplastic resin, the internal stress can be relieved, thereby to decrease subsequent variation, and the variation of optical anisotropy $\Delta n d$ can be enhanced to reach a stable value.

Therefore, variations in the properties of the optical compensator plate thereafter can be decreased.

In case of using the optical compensator plate in combination with a liquid crystal device, the manufacturing steps of the optical compensator plate and the annealing step to be done thereafter can be adjusted to give the desired optical anisotropy $\Delta n d$, to provide an appropriate optical compensator plate for compensating the optical anisotropy of the liquid crystal cell.

Thus, an optical compensator plate having stabilized optical properties can be provided.

BRIEF DESCRIPTION OF THE DRAWING

FIGS. 1A and 1B are graphs showing variation of the optical anisotropy of optical compensator plates which are subjected to an treatment according to the embodiment of this invention.

DESCRIPTION OF THE PREFERRED EMBODIMENTS

Figure 2:
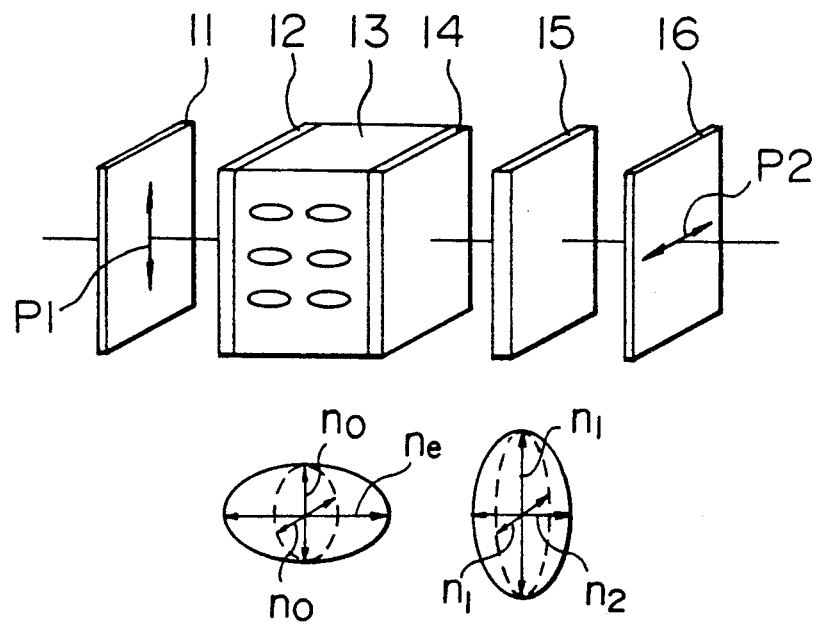
FIG. 2 is a schematic diagram of a liquid crystal device.

Before describing the embodiments of this invention, prior work of conventional manufacturing of an optical compensator plate utilizing autoclaving furnace will be described.

For example, a thermoplastic resin film is sandwiched between a pair of glass plates to form a laminated structure. This laminated structure is placed in an evacuatable bag. The inside of the bag is evacuated and then the open end of the bag is sealed. The sealed bag is loaded in an autoclaving furnace. When pressure is applied in the autoclaving furnace, the pressure is applied to the thermoplastic resin film through the pair of glass plates along the direction of thickness. Also, the autoclaving furnace is heated to a predetermined temperature. Thus, the thermo-plastic resin film is subjected to a pressure and a heat treatment.

When the thermoplastic resin film is formed of ionomer resin which is formed by bridging ethylene-acrylic acid or ethylene-methacrylic acid copolymer molecules with metal ions, a resin film having a negative optical anisotropy can be provided by the above pressure and heat treatment. According to this method of manufacturing an optical compensator plate as described above, however, the optical properties of the optical compensator plate tend to vary over the passage of time. The variation is not significant when the plate is used at ordinary temperatures, but when the compensator plate is kept at a raised temperature above about 60° C., the product $\Delta n \cdot d$ of the difference of the refractive indice $\Delta n$ for the ordinary ray and the extraordinary ray and the film thickness d does increase. In a liquid crystal panel, even if an optical compensator plate initially matched to the optical anisotropy of the liquid crystal is combined with the liquid crystal cell, appropriate compensation cannot be attained if the optical properties of the optical compensator plate vary with the lapse of time in use.

Now, embodiments of this invention will be described.

First, an optical compensator plate is made in an autoclaving furnace as described above. Between a pair of transparent substrates such as glass plates, ionomer resin film is sandwiched, which is formed by bridging ethylene-acrylic acid or ethylene-methacrylic acid copolymer molecules with metal ions. The sandwiched structure is put in an evacuatable hermetic bag and the bag is evacuated. The the evacuated bag is sealed and loaded in an autoclaving furnace. The temperature and the pressure of the autoclaving furnace are raised to desired values and then are kept constant for a predetermined time period. For example, the autoclaving furnace is kept at a temperature of 100°–150° C. at a pressure of 1–5 kg/cm² for about 30 minutes. Then, the temperature and the pressure of the autoclaving furnace are lowered to retrieve the laminated structure. When the laminated structure is used as it is, as an optical compensator plate, the optical property will change with the lapse of time as described above.

As an annealing step after manufacture, the laminated structure is loaded in an annealing furnace and annealing at about 60°–100° C. is done for about 1–3 hours.

Here, the annealing temperature is preferably not less than the softening temperature and not higher than the melting point of the ionomer resin film. If the temperature is below the softening temperature, the annealing effect is low. If the temperature is above the melting point, the once formed optical anisotropy will decrease. In case of HI-MILAN (trade name) available from Mitsui Du-pont Polychemical, Japan, the annealing temperature is preferably not higher then 90° C. The annealing time may depend on the annealing temperature, but is preferably not shorter than about 30 minutes. When the annealing time is below 30 minutes, the annealing effect may not be fully exhibited. After predetermined annealing treatment is done, the temperature of the annealing furnace is lowered and the laminated structure is taken out to be used as an optical compensator plate.

By such annealing treatment, the variation of the refractive index thereafter is decreased, and also distribution of the optical properties in the plane of the optical compensator plate is decreased. Further, although the maximum use temperature was about 40° C. in the conventional case, the maximum use temperature of the liquid crystal panel according to the present invention is increased to, for example about 60° C. by performing the annealing treatment at about 60° C.

Variations of the amount of optical anisotropy ($\Delta nd$) when the annealing treatment as described above is performed are shown in FIG. 1A and 1B, taking examples of the ionomer resin bridging ethylene methacrylic acid copolymer molecules with sodium ions, and the ionomer resin bridging ethylene methacrylic acid copolymer molecules with magnesium ions.

In the figures, the abscissa represents the annealing time and the ordinate represents $\Delta nd$. Here, the zero point on the time axis represents the time when an optical anisotropic plate manufactured by the autoclaving technique is set in an annealing furnace and annealing treatment is started. Annealing is first done at 60° C. for 6 hours. Then the temperature is raised to 70° C., and the annealing is continued for 6 hours. Then, the temperature is raised to 80° C. and annealing is continued for 6 hours. Then the temperature is raised to 90° C. and annealing is continued for 6 hours. And so on. In this way, the annealing treatment is done by raising the temperature stepwise.

As shown FIG. 1A, in the case of sodium ion type ionomer resin, the value of $\Delta nd$ rapidly rises at the initial stage, and then varies very gradually thereafter. Namely, it can be considered that the variation of $\Delta nd$ in a first period can be fully exhibited by performing heat treatment at about 60° C. for about 30 minutes or more. The stabilized optical anisotropy $\Delta n$ was about $-1.3 \times 10^{-3}$.

In the case of a magnesium ion type ionomer resin as shown in FIG. 1B, the initial variation appears more dramatically. Namely, by the annealing at 60° C., the value of $\Delta nd$ increases from about 190 to about 280 in an arbitrary scale by annealing of about one hour.

Thereafter, the increase becomes gradual but the value of $\Delta nd$ continues to be varied. When the temperature is raised to 70° C., the value $\Delta nd$ varies rapidly again. When the temperature is raised to 80° C., the value of $\Delta nd$ now shows a decrease. But along with the lapse of annealing time, the value of $\Delta nd$ shows a slight increase. When the temperature is raised to 90° C., the value of $\Delta nd$ decreases further dramatically. Namely, in the case of magnesium of ion type ionomer, the value of $\Delta nd$ becomes maximum around 70° C.

In the case of magnesium ion type ionomer, also, the variation of $\Delta nd$ in the initial stage can be forcedly exhibited by performing the heat treatment at a temperature not less than about 60° C. for about 30 minutes or more, to decrease the variation thereafter.

FIG. 4 shows a liquid crystal display device. A homeotropic liquid crystal layer 13 is sandwiched between a pair of glass substrates 12 and 14 provided with electrodes. A pair of crossed polarizers 11 and 16 having crossed polarization axes P1 and P2 are positioned outside the liquid crystal cell. An optical compensator film 15 manufactured according to the above described embodiment is inserted between the liquid crystal cell 12, 13, 14 and one of the polarizers 16.

When the liquid crystal molecules in the liquid crystal layer 13 are aligned perpendicular to the substrates, a positive optical anisotropy is established. The compensator plate 15 has a negative optical anisotropy to compensate the positive optical anisotropy of the liquid crystal layer 13.

Although description has been made of various embodiments of this invention, the present invention is not limited thereto. It will be apparent to those skilled in the art that various changes, substitutions, improvements, combinations, etc. are possible within the scope of the present invention.

I claim:

1. A method of manufacturing an optical compensator plate comprising the steps of:
    (a) applying heat and pressure to an ionomer resin film to form a resin film having birefringence; and
    (b) annealing said resin film after said first step, at an annealing temperature of at least the softening temperature and not higher than the melting point of said resin, for at least about 30 minutes to anneal said resin film.

2. The method according to claim 1, wherein said annealing temperature is in the range of 60° to 100° C.

3. The method according to claim 1, wherein said ionomer resin is formed by bridging ethylene-methacrylic acid copolymer molecules with metal ions.

4. The method according to claim 3, wherein said annealing temperature is in the range of 60° to 90° C.

5. The method according to claim 1, wherein in step (a) the thermoplastic resin is heated to a temperature in the range of 100° to 150° C.

6. A method of manufacturing an optical compensator plate comprising the steps of:

(a) applying heat and pressure to an ionomer resin film to form a resin film having birefringence; and (b) annealing said resin film after said first step, at an annealing temperature of at least the softening temperature and not higher than the melting point of said resin, for at least about 30 minutes to anneal said resin film;

wherein the optical anisotropy $\Delta n \cdot d$ is matched to a predetermined optical anisotropy to be compensated, where $\Delta n = n_o - n_e$, n is the refractive index of the optical compensator plate, $n_o$ is the retractive index of an ordinary ray, $n_e$ is the refractive index of an extraordinary ray, and d is the thickness of said compensator plate.

* * * * *